(12) United States Patent
Owejan et al.

(10) Patent No.: US 7,862,936 B2
(45) Date of Patent: Jan. 4, 2011

(54) WATER REMOVAL CHANNEL FOR PEM FUEL CELL STACK HEADERS

(75) Inventors: Jon P. Owejan, Honeoye, NY (US); Steven R. Falta, Honeoye Falls, NY (US); Pinkhas A. Rapaport, Fairport, NY (US); Thomas A. Trabold, Pittsford, NY (US); Thomas W. Tighe, Bloomfield, NY (US); Lee C. Whitehead, Middleport, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1028 days.

(21) Appl. No.: 11/622,492

(22) Filed: Jan. 12, 2007

(65) Prior Publication Data
US 2008/0171253 A1 Jul. 17, 2008

(51) Int. Cl.
*H01M 2/02* (2006.01)
(52) U.S. Cl. .................... 429/414; 429/457
(58) Field of Classification Search ............. 429/34, 429/36, 38, 12, 30, 414, 457, 483, 514, 518
See application file for complete search history.

(56) References Cited

U.S. PATENT DOCUMENTS

| | | | |
|---|---|---|---|
| 7,687,181 B2 * | 3/2010 | Osenar et al. | 429/36 |
| 2003/0180598 A1 * | 9/2003 | Fischer et al. | 429/34 |
| 2006/0105219 A1 * | 5/2006 | Anderson | 429/34 |

* cited by examiner

*Primary Examiner*—Jennifer Michener
*Assistant Examiner*—Monique Wills
(74) *Attorney, Agent, or Firm*—Fraser Clemens; Martin & Miller LLC; J. Douglas Miller

(57) ABSTRACT

A bipolar plate for a fuel cell is disclosed including a first unipolar plate having an active surface with a plurality of flowfield channels formed therein. The first unipolar plate further includes an inlet header disposed at a first end of the unipolar plate that is in communication with the active surface, and an outlet header disposed at a second end of the unipolar plate having an exhaust opening formed therethrough. A peripheral edge of the exhaust opening is chamfered and is also in communication with the active surface. The chamfered exhaust opening forms a water removal channel in the bipolar plate. A fuel cell stack including the bipolar plate is also disclosed.

19 Claims, 4 Drawing Sheets

WATER REMOVAL CHANNEL FOR PEM FUEL CELL STACK HEADERS

FIELD OF THE INVENTION

The present invention relates to fuel cell systems and, more particularly, to a means for water removal from bipolar plates in a fuel cell assembly.

BACKGROUND OF THE INVENTION

Fuel cells have been proposed as a clean, efficient and environmentally responsible power source for electric vehicles and various other applications. One example of a fuel cell is the Proton Exchange Membrane (PEM) fuel cell. The PEM fuel cell includes a membrane-electrode-assembly (MEA) that generally comprises a thin, solid polymer membrane-electrolyte having a catalyst and an electrode on both faces of the membrane-electrolyte.

The MEA generally comprises porous conductive materials, also known as gas diffusion media, which form the anode and cathode electrode layers. Fuel, such as hydrogen gas, is introduced at the anode where it reacts electrochemically in the presence of the catalyst to produce electrons and hydrogen cations. The electrons are conducted from the anode to the cathode through an electrical circuit connected therebetween. Simultaneously, the hydrogen cations pass through the electrolyte to the cathode where an oxidant, such as oxygen or air, reacts electrochemically in the presence of the electrolyte and catalyst to produce oxygen anions. The oxygen anions react with the hydrogen cations to form water as a reaction product.

The MEA is generally interposed between a pair of electrically conductive contact elements or bipolar plates to complete a single PEM fuel cell. Bipolar plates serve as current collectors for the anode and cathode, and have appropriate flow channels and openings formed therein for distributing the fuel cell's gaseous reactants (i.e., the $H_2$ & $O_2$/air) over the surfaces of the respective electrodes. Bipolar plates can be assembled by bonding together two unipolar plates having the flow distribution fields formed thereon. Typically, bipolar plates also include inlet and outlet headers which, when aligned in a fuel cell stack, form internal supply and exhaust manifolds for directing the fuel cell's gaseous reactants and liquid coolant to and from, respectively, a plurality of anodes and cathodes.

As is well understood in the art, the membranes within a fuel cell need to have a certain relative humidity to maintain an ionic resistance across the membrane within a desired range to effectively conduct protons. During operation of the fuel cell, moisture from the MEAs and external humidification may enter the anode and cathode flow channels. As moisture is forced along the flow channels by a pressure of reactant gases, the highest concentration of water exists at the outlet regions of the bipolar plates where gas velocities are lowest. Water can accumulate and form a film in these regions, in a phenomenon known as stagnation. Stagnant water can block flow channels and reduce the overall efficiency of the fuel cell. A high degree of water accumulation or stagnation can lead to fuel cell failure.

Minimizing water stagnation has been possible, for example, by purging the channels periodically with reactant gas at a higher flow rate. However, on the cathode side, this increases the parasitic power applied to the air compressor and reduces overall system efficiency. Moreover, the use of hydrogen as a purge gas is not desirable for a number of reasons, including reduced economy, poorer system efficiency, and increased system complexity.

A reduction in accumulated water in channels can also be accomplished by lessening inlet humidification. However, it is desirable to provide at least some relative humidity in the anode and cathode reactants to hydrate the fuel cell membranes. Dry inlet gas has a desiccating effect on the membrane-electrolyte and can increase a fuel cell's ionic resistance. This method also negatively affects the long-term durability of the membrane-electrolyte.

There is a continuing need for a water removal mechanism that transports accumulating water from the flowfield channels to the exit of the fuel cell stack. Desirably, the mechanism does not reduce system efficiency or have a drying effect on the membrane-electrolyte of individual fuel cells.

SUMMARY OF THE INVENTION

In concordance with the instant disclosure, a bipolar plate having a water removal mechanism that transports water from the flowfield channels, maximizes system efficiency, and minimizes a drying of the membrane-electrolyte of individual cells, is surprisingly discovered.

In one embodiment a bipolar plate is provided having a first unipolar plate with an active surface having a plurality of flowfield channels formed therein. The active surface of the first unipolar plate has an inlet region and an outlet region. The first unipolar plate further comprises an inlet header disposed at a first end of the unipolar plate and an outlet header disposed at a second end of the unipolar plate. The inlet header is in communication with the inlet region of the active surface. The outlet header further comprises an exhaust opening formed therethrough. A peripheral edge of the exhaust opening is chamfered and in communication with the outlet region of the active surface.

There is further provided a fuel cell stack including at least one fuel cell having a membrane electrode assembly disposed between a pair of bipolar plates. Each bipolar plate has an active surface with a plurality of flowfield channels formed therein. The fuel cell stack further includes an exhaust manifold formed by an exhaust opening in each bipolar plate, the exhaust manifold including a water removal channel that is in communication with the active surface of the bipolar plate. The water removal channel induces a capillary driven flow of liquid water from the active surface.

The water removal channel, in particular embodiments, is triangular in shape. The fuel cell stack can further include a drainage conduit formed by an exhaust opening in each bipolar plate. The drainage conduit is in communication with the water removal channel and militates against an accumulation of water in the flowfield channels and in the exit of the channels during operation of the fuel cell stack. The drainage conduit can be unfilled, coated or textured, and may include a pillar of hydrophilic material.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
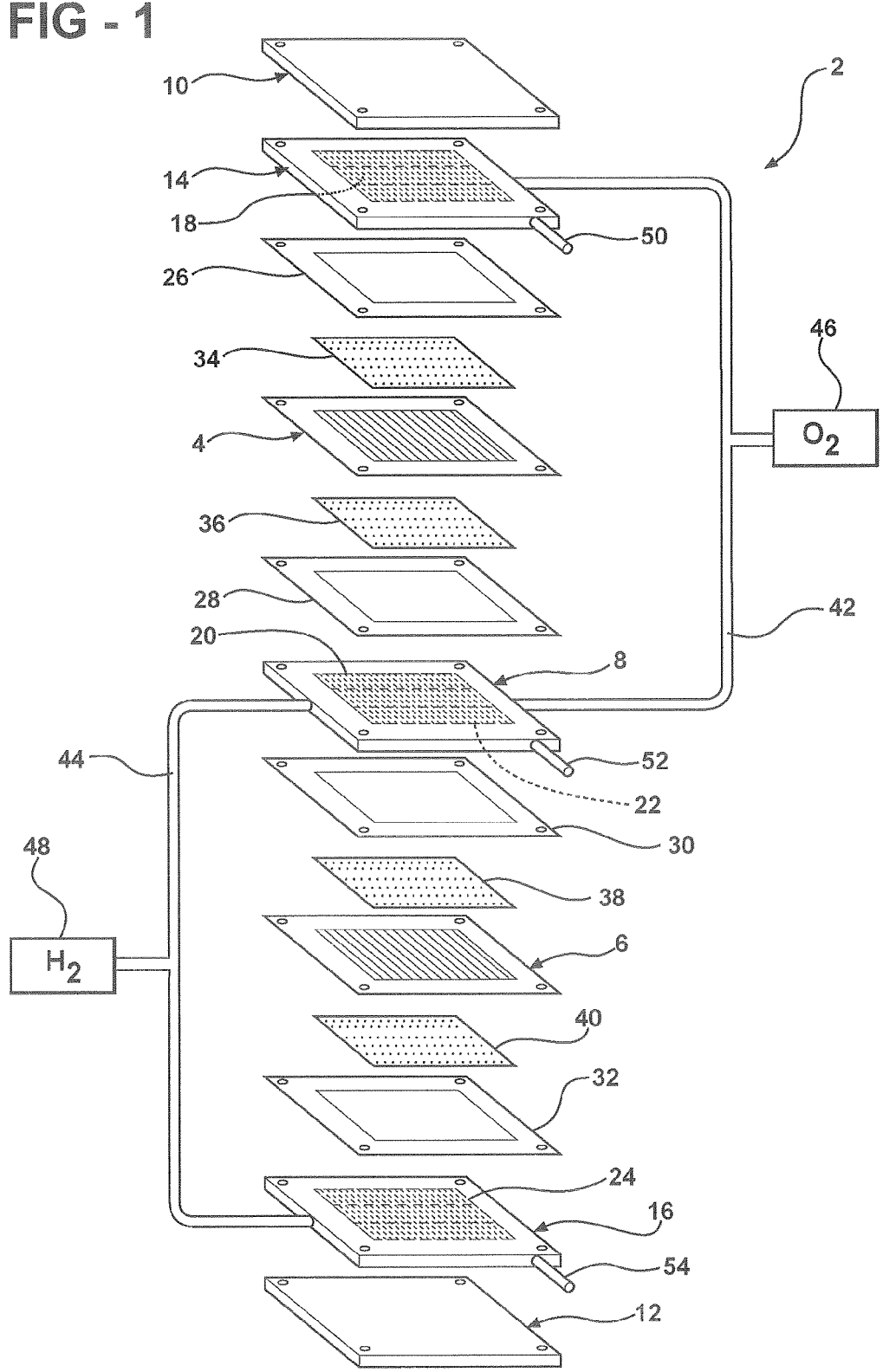
FIG. 1 illustrates a schematic, exploded perspective view of a PEM fuel cell stack (only two cells shown)

The following description is merely exemplary in nature and is not intended to limit the present disclosure, application, or uses. It should also be understood that throughout the drawings, corresponding reference numerals indicate like or corresponding parts and features.

FIG. 1 depicts a two cell PEM fuel cell stack 2 having a pair of membrane-electrode-assemblies (MEAs) 4, 6 separated from each other by an electrically conductive fluid distribution element 8, hereinafter a bipolar plate 8. The MEAs 4, 6 and bipolar plate 8, are stacked together between end plates 10, 12, and end contact elements 14, 16. The end contact element 14, both active surfaces of the bipolar plate 8, and the end contact element 16 contain a plurality of flowpaths or flow channels 18, 20, 22, 24, respectively, for distributing a fuel such as $H_2$ and an oxidant gas such as $O_2$, for example, to the MEAs 4, 6. Nonconductive gaskets 26, 28, 30, 32 provide seals and electrical insulation between components of the fuel cell stack 2.

Electrodes 34, 36, 38, 40 of the MEAs 4, 6 are typically formed by a gas permeable conductive material such as a carbon/graphite diffusion paper, for example. The electrodes 34, 36, 38, 40 abut the electrode faces of the MEAs 4, 6. The end contact elements 14, 16 are forced against the electrodes 34, 40 respectively, while the bipolar plate 8 abuts the electrode 36 on an anode face of MEA 4, configured to accept a hydrogen-bearing reactant, and abuts electrode 38 on a cathode face of MEA 6, configured to accept an oxygen-bearing reactant. The oxygen-bearing reactant is supplied to a cathode side of the fuel cell stack 2 from a storage tank 46 by an appropriate supply conduit 42, while the hydrogen-bearing reactant is supplied to an anode side of the fuel cell stack 2 from storage tank 48, by an appropriate supply conduit 44. Alternatively, ambient air may be supplied to the cathode side as an oxygen-bearing reactant and hydrogen to the anode side from a methanol or gasoline reformer, or the like. An exhaust conduit (not shown) for both the anode and the cathode sides of the MEAs 4, 6 is also provided. Additional conduits 50, 52, 54 are provided for supplying a coolant to the bipolar plate 8 and the end plates 14, 16. Appropriate conduits (not shown) for exhausting coolant from the bipolar plate 8 and the end plates 14, 16 is also provided.

Figure 2:
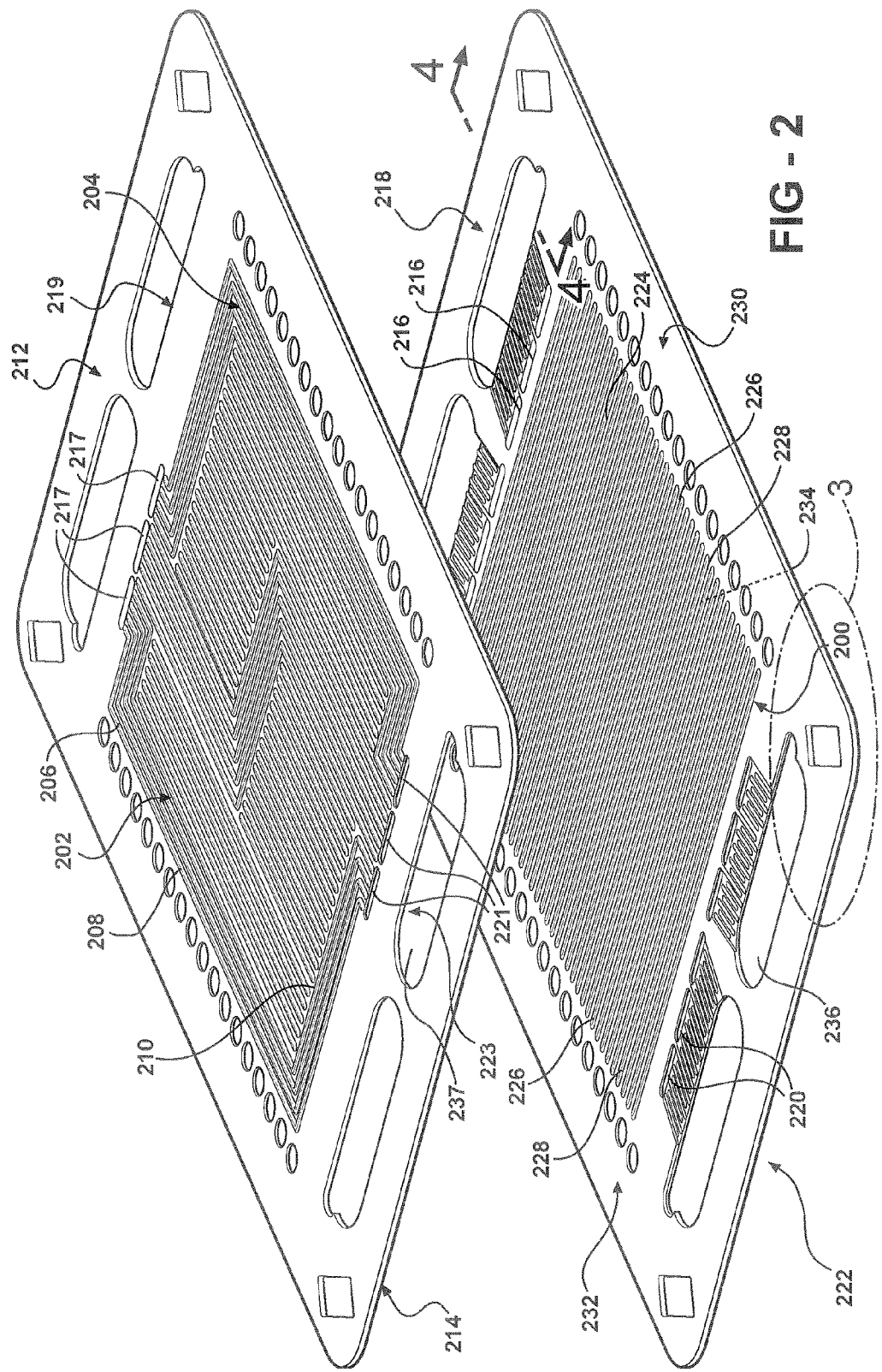
FIG. 2 is an exploded perspective view of an illustrative bipolar plate, assembled from a pair of unipolar plates, for use in PEM fuel cell stacks.

FIG. 2 is an exploded perspective view of an illustrative bipolar plate 8 that may be used in accordance with an embodiment of the present invention. The bipolar plate 8 comprises a first exterior metal (or conductive polymer) sheet or unipolar plate 200 and a second exterior metal sheet or unipolar plate 202. The unipolar plates 200, 202 are typically formed by stamping or any other conventional process for shaping sheet metal, such as, for example, photo etching through a photolithographic mask. Typical processes such as molding are used to shape conductive polymer plates. It should be recognized that sheet metal is available in a variety of gauges which are suitable for the unipolar plates 200, 202 of the present invention. As nonlimiting examples, suitable sheet metal gauges can range from less than about 30 gauge (0.0157 inches) to about 8 gauge. (0.161 inches). In particular embodiments, the metal sheets are from about 0.002 inches to about 0.02 inches thick. It is understood, however, that sheet metal of other thicknesses can be used as desired. It is further understood that other materials can be used. As nonlimiting examples, the bipolar plate 8 may comprise graphite or graphite-filled polymer.

An internal face 224 of the first unipolar plate 200 is shown in FIG. 2. A plurality of ridges 226 is formed in the internal face 224, defining therebetween a plurality of channels 228 through which coolant flows from a first side 230 of the bipolar plate to a second side 232. The underside of the unipolar plate 200 also includes a plurality of ridges (not shown) which define therebetween a plurality of channels (not shown) through which coolant passes during the operation of the fuel cell stack 2. It should be recognized that the underside of the unipolar plate 200 can also be flat. Thus, channels 228 form coolant flow fields in an interior volume defined by the unipolar plates 200, 202.

The second unipolar plate 202 has a first active surface 204 on an outer surface thereof which confronts a membrane electrode assembly (not shown), and is formed to provide a flow field 206. The flow field 206 is defined by a plurality of lands 208. The plurality of lands 208 define therebetween a plurality of flow channels 210 which constitute the "flow field" through which the reactant gases flow in a meandering path from a first end 212 of the bipolar plate to a second end 214 thereof. When the fuel cell is fully assembled, the lands 208 abut the porous material, carbon/graphite papers 36, 38 which, in turn, abut the MEAs 4, 6.

Typically, the lands 208 and the flow channels 210 cover the outer surface of the unipolar plates 200, 202 that abut the carbon/graphite papers 36, 38. The reactant gas is supplied to flow channels 210 from supply ports 216, 217 formed in an inlet header 218, 219 disposed at the first end 212 of the bipolar plate 8, and exits the flow channels 210 via exit ports 220, 221 formed in an outlet header 222, 223 disposed at the second end 214 of the bipolar plate.

It should be understood that an exterior structure of the unipolar plate 200 corresponds substantially to an exterior of the unipolar plate 202. For example, like the unipolar plate 202, the external side of the unipolar plate 200 has an active surface (not shown). The unipolar plate 200 is formed to provide a flow field 234. The flow field 234 is defined by a plurality of lands (not shown) formed thereon and defining a plurality of flow channels (not shown) which constitute the flow field 234 through which the reactant gases pass.

The unipolar plates 200, 202 further have exhaust openings 236, 237 formed in the outlet headers 222, 223. The exhaust openings 236, 237 form an exhaust manifold 402 (shown in FIG. 4) in the aligned and assembled bipolar plate 8 which provides a passage for exhaust reactants and reaction products, for example water and water vapor, to exit the fuel cell stack 2.

Figure 3:
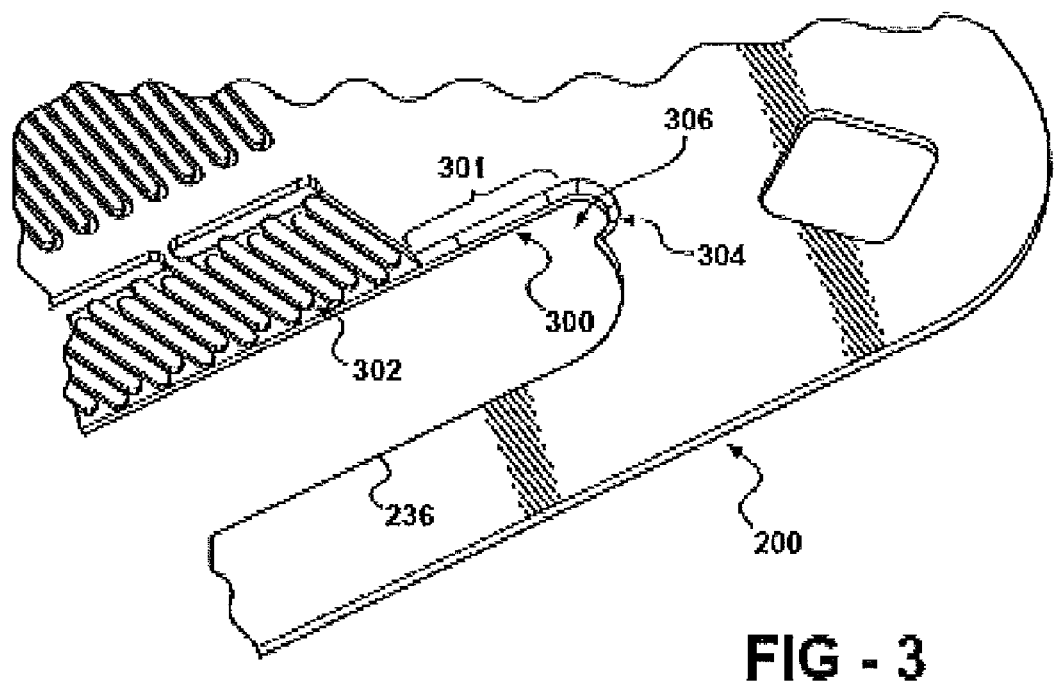
FIG. 3 is a fragmentary view of the unipolar plates illustrated in FIG. 2.
Figure 4:
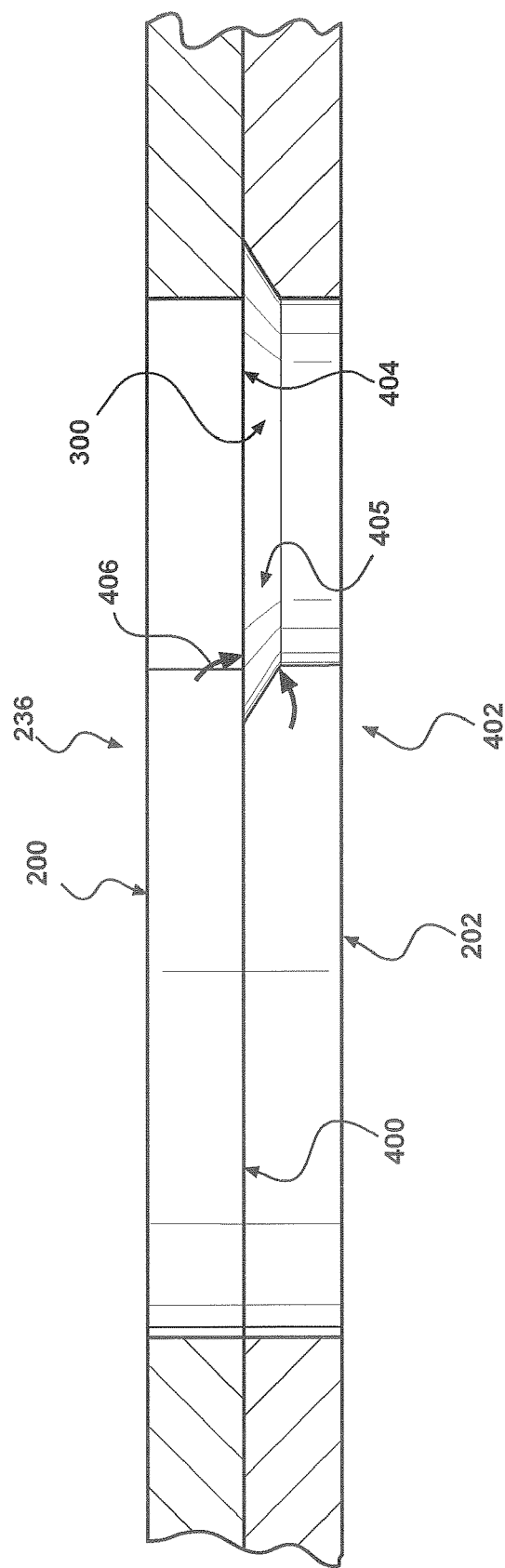
FIG. 4 is a fragmentary cross-sectional view of an exhaust manifold of the bipolar plate shown in FIG. 2.

As depicted in FIG. 3 and FIG. 4, the exhaust opening 236 of the first unipolar plate 200 can include a peripheral chamfered edge 300. The chamfered edge 300 is in communication with the active surface 204. As a nonlimiting example, the chamfered edge 300 may communicate with the active surface 204 via microchannels 302 formed in the unipolar plate 200 and disposed between the outlet ports 220 and the exhaust opening 236. The microchannels 302 function to transport water directly from the active surface 204, particularly near the second end 214 where pressure from the reactant gas is lower and a film of stagnant water can typically form.

Typically, the unipolar plates 200, 202 are bonded together, for example by an adhesive, to form the assembled bipolar plate 8. Bonding may be accomplished, for example, by brazing, diffusion bonding, laser welding, or gluing with a conductive adhesive, as is well known in the art. Suitable binders 400 are known to those of skill in the art and can be chosen as desired.

Upon bonding, it should be understood that the chamfered edge 300 forms a water removal channel 405. For example, as depicted in FIG. 4, the first unipolar plate 200 is bonded to the second unipolar plate 202 with the binder 400. The bipolar plate 8 includes an exhaust manifold 402 formed by the exhaust openings 236, 237 disposed in the unipolar plates 200, 202. The exhaust opening 236 of the first unipolar plate 200 having the chamfered edge 300 is bonded to a non-chamfered surface 404 of the second unipolar plate 202 to form the water removal channel 405. In some embodiments, particularly when the surface of the second unipolar plate 202 is not chamfered, the water removal channel 405 is a substantially V-shaped or triangular groove.

In other embodiments, both the first and second unipolar plates 200, 202 can have the exhaust openings 236, 237 with the chamfered edge 300. However, it should be appreciated that for simplicity in manufacturing, having only the single chamfered exhaust opening 236, 237 may be desired.

The shape of the water removal channel 405 induces a capillary driven flow of water from the active surface 204. Water in the water removal channel 405 is spread along the surface in a process termed spontaneous wetting or spontaneous imbibition. This process as it relates to open capillaries produced by V-shaped or triangular surface grooves is described, for example, in Rye et al., Langmuir, 12.555-565 (1996), incorporated herein by reference. The physical requirements to support spontaneous wetting in the corners of a flow channel are characterized by the Concus-Finn condition, $\beta+\alpha/2<90°$, where $\beta$ is a static contact angle formed between a liquid surface and a solid surface. An $\alpha$ is the channel corner angle 406, and in particular embodiments the angle formed by the intersection of the chamfered edge 300 of the first unipolar plate 200 with the non-chamfered surface 404 of the second unipolar plate 202. The static contact angle is a property specific to a particular surface and material that is experimentally determined, for example by placing a liquid droplet the surface and recording when the equilibrium condition is met, i.e. where no further spreading of the droplet occurs. The contact angle reading, which is determined at this condition and typically defined geometrically as the angle formed by the liquid drop at the three phase boundary where the liquid, air and surface intersect, is the static contact angle.

As a nonlimiting example, a rectangular channel has an $\alpha/2$ of 45°, which dictates that spontaneous wetting will occur when the static contact angle is less than 45°. In particular embodiments of the invention described herein, the water removal channel 405 is triangular and has a $\beta+\alpha/2<90°$, thereby satisfying the Concus-Finn condition. Illustratively, the triangular shape of water removal channel 405 may have an acute angle. Thus, water transported along flow channels 210, in communication with the water removal channel 405, is transported by capillary force into a bottom, and along a length 301, of the triangular water removal channel 405.

It should be understood, for reasons provided above regarding the capillary function of the water removal channel 405, that the junction formed by bonding of the unipolar plates 200, 202 should be substantially acute, i.e. the angle should terminate at discrete point and not be rounded. The bonding of a chamfered edge 300 to a non-chamfered edge 404, as described herein, can provide a substantially acute angle. Alternative methods that provide such a substantially acute angle can also be used.

With renewed reference to FIG. 3, a cross-sectional area of the water removal channel 405 can be reduced along a length 301 of the channel 405 formed by the chamfered edge 300, essentially changing a volume of the channel 405 along the length 301. Typically, the channel 405 volume decreases in the direction of the drainage portion 304. It should be understood that such a decrease in the volume of channel 405 can be effective in increasing the rate of capillary flow from the active surface 204. The decrease in cross-sectional area can be effected, for example, by decreasing the channel corner angle 406. The decrease may be continuous along the length of the water removal channel 405 or can be discontinuous and comprise, for example, discrete steps along the length of the channel 405. In other embodiments, the cross-sectional area of the channel 405 may be reduced by shallowing the channel 405, for example with an angled insert. It should be understood that the channel angle corner 406 should remain substantially acute, however, so as to facilitate the capillary driven flow dictated by the Concus-Finn condition.

The water that is spontaneously imbibed by the water removal channel 405 of the present disclosure can form droplets that are transported from the fuel cell stack 2 via the exhaust manifold 402. With renewed reference to FIG. 2 and FIG. 3, the exhaust openings 236, 237 can include the drainage portion 304 in communication with the chamfered edge 300. Upon alignment and bonding of the first unipolar plate 200 to the second unipolar plate 202, drainage portion 304 forms a drainage conduit 306 in communication with the water removal channel 405. The drainage conduit 306 provides an exit for water which is driven by capillary flow into the water removal channel 405, thereby preventing the water removal channel 405 from being completely filled and allowing for continuous removal of water from the second end 214 of the active surface 204.

The water removal channel 405 and/or the drainage conduit 306 can be treated to increase their hydrophilicity and enhance water removal. Such treatment can include the application of a hydrophilic coating. Suitable hydrophilic coatings are described, for example, in copending U.S. patent application Ser. Nos. 11/068,489, 11/463,386, and 11/463,384, incorporated herein by reference.

As nonlimiting examples, the hydrophilic coating can include at least one Si—O group, at least one polar group and at least one group including a saturated or unsaturated carbon chain. In further embodiments the coating comprises at least one Si—O group and an Si—R group, wherein R includes a saturated or unsaturated carbon chain and the molar ratio of Si—R groups to Si—O groups ranges from 1/8 to 1/2. The hydrophilic coating may also be applied by any means sufficient for applying hydrophilic coatings. For example, a coating may be deposited using a plasma assisted chemical deposition process which includes a precursor gas, e.g. a siloxane gas, and further a second gas, e.g. oxygen. Suitable hydrophilic coatings can also includes nanoparticies having a size ranging from 1 to 100 nanometers, wherein the nanoparticles comprise a compound comprising a Si—O group, a saturated or unsaturated carbon chain and a polar group. It should be appreciated that other hydrophilic coatings can also be used.

A surface of the water removal channel 405 and/or the drainage conduit 306 can be textured to provide increased hydrophilicity. Surface textures can include a matte finish created, for example by sandblasting. Patterns may also be etched, for example chemically, to provide a desired degree of roughness. Further, the surface of the water removal channel 405 and/or the drainage conduit 306 may include microcorrugation or microchannels. One of skill in the art should again appreciate that other surface textures providing increased hydrophilicity can also be used.

Figure 5:
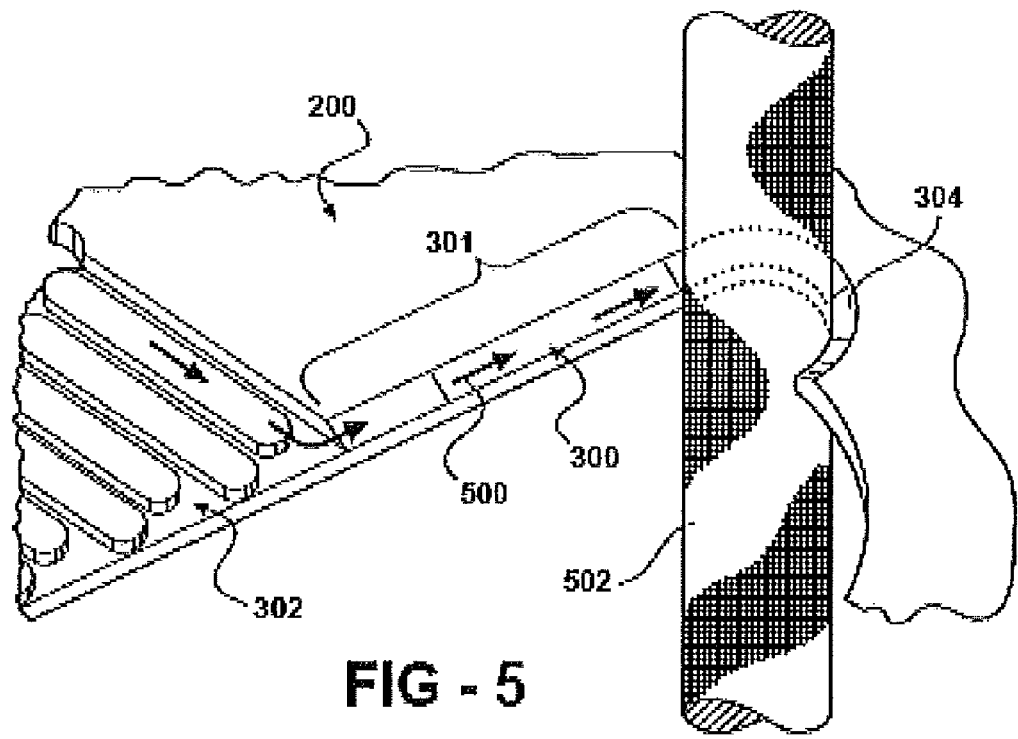
FIG. 5 is a fragmentary view of the unipolar plates illustrated in FIG. 2 taken along line 4-4 and also depicting a flow of water and a drainage pillar.

FIG. 5 illustrates a direction of water flow 500 through the microchannels 302 formed in the unipolar plate 200 and along the length 301 of the chamfered edge 300 which forms water removal channel 405. Typically, liquid water exiting the unipolar plate 200 will wick by capillary action into the water removal channel 405 formed by the chamfered edge 300. Liquid water will then equilibrate to a thickness thereof in the water removal channel 405, ultimately making contact with the drainage conduit 306, where the water drains under gravitational forces as the water removal channel 405 fills.

Further depicted in FIG. 5 is a pillar 502 disposed within the drainage conduit 306. The pillar 502 contacts the drainage portions 304 in bipolar plates 8 and comprises a hydrophilic material that facilitates water removal from the water removal channel 405. The pillar 502 is typically wetted upon contact with water and provides a surface for the water to drain away from the fuel cell stack 2. It should be understood that the hydrophilic material is also electrically nonconductive so as to prevent short-circuiting of the fuel cell stack 2. Nonlimiting examples of suitable hydrophilic material can include plastics, elastomers, ceramics, and glasses. In particular embodiments, resilient materials such as plastics and elastomers are used in light of the expansion and contraction that can occur in the fuel cell stack 8 during normal operation. One example of a suitable plastic is Delrin®, an acetal polyoxymethylene (POM) resin available from the E. I. du Pont de Nemours and Company.

The hydrophilic material can also be porous, for example sintered plastics or foam elastomers. The hydrophilic material can also be fibrous. In particular embodiments, the hydrophilic material comprises a bundle of fibers that when braided or twisted together are used to draw water away from the fuel cell stack 2.

One of ordinary skill should further understand that the described water removal mechanisms, e.g. the water removal channel 405 and the drainage conduit 306, may be used in conjunction with other means for removing water as known in the art.

The bipolar plate 8 of the present disclosure maintains an efficiency of the fuel cell stack 2 because water is wicked by capillary force from the outlet regions of the fuel cell stack 2. The removal of water by capillary force does not act as a parasitic load on the fuel cell stack 2. Such water removal also does not require a lessening in inlet humidification, known to have a drying effect on the membrane-electrolyte-assemblies 4, 6 of individual cells. A freeze durability of the fuel cell stack 2 is also maximized since the water removal channel 405 militates against water stagnation in the outlet regions of the fuel cell stack 2, where the water might otherwise freeze under frigid conditions. The bipolar plate 8 minimizes maldistribution of water throughout fuel cell stack 2, which typically is caused by water stagnation and blockage of the flow channels 210. Such improved distribution of water maximizes the stability and optimizes overall performance of the fuel cell stack 2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bipolar plate for a fuel cell comprising:
a first unipolar plate and a second unipolar plate, the second unipolar plate having an active surface with a flowfield formed therein;
an inlet header disposed at a first end of the first unipolar plate and in communication with the active surface; and
an outlet header disposed at a second end of the first unipolar plate and including an exhaust opening formed therethrough, a peripheral edge of the exhaust opening being chamfered and in communication with the active surface,
wherein the first unipolar plate is bonded to the second unipolar plate, and a non-chamfered surface of the second unipolar plate cooperates with the chamfered peripheral edge of the first unipolar plate to form a water removal channel, the water removal channel in communication with the active surface.

2. The bipolar plate of claim 1, wherein the water removal channel is a triangular groove.

3. The bipolar plate of claim 1, wherein the exhaust opening further includes a drainage portion in communication with the water removal channel.

4. The bipolar plate of claim 1, wherein the water removal channel includes a hydrophilic coating disposed thereon.

5. The bipolar plate of claim 1, wherein a surface of the water removal channel is textured.

6. The bipolar plate of claim 1, wherein the water removal channel has an acute corner angle.

7. The bipolar plate of claim 6, the water removal channel having a static contact angle and a chamfer angle, wherein the sum of the static contact angle and one half of the channel angle is less than 90 degrees.

8. The bipolar plate of claim 3, wherein a cross-sectional area of the water removal channel decreases along a length of the water removal channel.

9. The bipolar plate of claim 8, wherein the decrease in the cross-sectional area is continuous.

10. A fuel cell stack comprising:
at least one fuel cell having a membrane electrode assembly disposed between a pair of bipolar plates, each bipolar plate including a first unipolar plate and a second unipolar plate, the second unipolar plate having an active surface with a flowfield formed therein, an inlet header disposed at a first end of the first unipolar plate and in communication with the active surface, and an outlet header disposed at a second end of the first unipolar plate and including an exhaust opening formed therethrough, a peripheral edge of the exhaust opening being chamfered and in communication with the active surface,
wherein the first unipolar plate is bonded to the second unipolar plate, and a non-chamfered surface of the second unipolar plate cooperates with the chamfered peripheral edge of the first unipolar plate to form a water removal channel,
wherein the water removal channel is in communication with the active surface and induces a capillary-driven flow of water from the active surface.

11. The fuel cell stack of claim 10 further comprising a drainage conduit in communication with the water removal channel.

12. The fuel cell stack of claim 11, wherein the drainage conduit is formed by an exhaust opening in each bipolar plate.

13. The fuel cell stack of claim 12, wherein the drainage conduit includes a hydrophilic coating disposed thereon.

14. The fuel cell stack of claim 12, wherein a surface of the drainage conduit is textured.

15. The fuel cell stack of claim 12, wherein the drainage conduit includes a pillar of hydrophilic material disposed therein.

16. The fuel cell stack of claim 15, wherein the hydrophilic material is porous.

17. The fuel cell stack of claim 15, wherein the hydrophilic material is selected from the group consisting of plastics, elastomers, ceramics, and glasses.

18. The fuel cell stack of claim 17, wherein the plastic includes polyoxymethylene.

19. A fuel cell stack comprising:
- at least one fuel cell having a membrane electrode assembly disposed between a pair of bipolar plates, each bipolar plate including a first unipolar plate and a second unipolar plate, the second unipolar plate having an active surface with a flowfield formed therein, an inlet header disposed at a first end of the first unipolar plate and in communication with the active surface, and an outlet header disposed at a second end of the first unipolar plate and including an exhaust opening formed therethrough, a peripheral edge of the exhaust opening being chamfered and in communication with the active surface,
- wherein the first unipolar plate is bonded to the second unipolar plate, and a non-chamfered surface of the second unipolar plate cooperates with the chamfered peripheral edge of the first unipolar plate to form a triangular water removal channel,
- wherein a drainage conduit is formed by the exhaust opening in each bipolar plate and is in communication with the water removal channel, the drainage conduit having a pillar of hydrophilic material disposed therein, and
- wherein the water removal channel is in communication with the active surface and induces a capillary-driven flow of water from the active surface to the drainage conduit, thereby militating against an accumulation of water in a flowfield channel during operation of the fuel cell stack.

* * * * *